United States Patent [19]

Salant

[11] 4,437,085
[45] Mar. 13, 1984

[54] ROUTE MAPPING DEVICE

[76] Inventor: Richard Salant, 2170 Century Park East, Suite 2008, Los Angeles, Calif. 90067

[21] Appl. No.: 193,657

[22] Filed: Oct. 3, 1980

[51] Int. Cl.³ .................. G08G 1/00; G08C 21/00
[52] U.S. Cl. .................. 340/286 M; 340/990; 340/712; 364/444
[58] Field of Search .......... 340/286 M, 24, 712, 340/707, 752, 825.49, 711; 364/460, 462, 521, 444, 448, 451; 343/112 C, 112 PT

[56] References Cited

U.S. PATENT DOCUMENTS

| | | | |
|---|---|---|---|
| 3,688,252 | 8/1972 | Thompson | 340/24 |
| 4,086,632 | 4/1978 | Lions | 364/444 |
| 4,301,506 | 11/1981 | Turco | 364/444 |
| 4,312,577 | 1/1982 | Fitzgerald | 364/444 |

*Primary Examiner*—James J. Groody
*Attorney, Agent, or Firm*—Spensley Horn

[57] ABSTRACT

A route mapping device comprising a transluscent map and a plurality of first light conducting fibers, the ends of which are disposed at points behind said map corresponding to locations of customers to whom deliveries may be made. Switching circuitry which includes a plurality of switches is provided for selectively directing light into each of said first light conducting fibers. A plurality of second light conducting fibers, each with one end adjacent the end of one of said first light conducting fibers behind said map, extend to a point proximate the switches which correspond to said first light conducting fibers to assist in designating the customers indicated by said switches. In another embodiment, the device comprises a conventional computer terminal with a keyboard and cathode ray tube display with a map on the surface thereof in communication with a computer which is programmed to direct the cathode ray tube to display lights through said map corresponding to customer locations. The computer is also programmed to compile a list of customers according to the order in which customer codes are entered through the keyboard.

12 Claims, 9 Drawing Figures

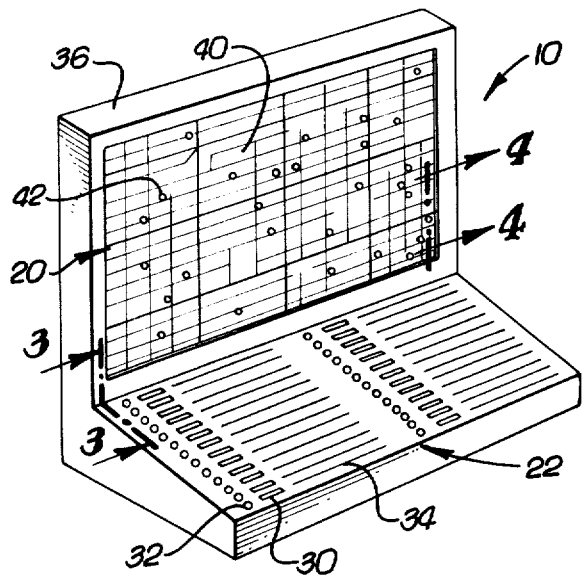
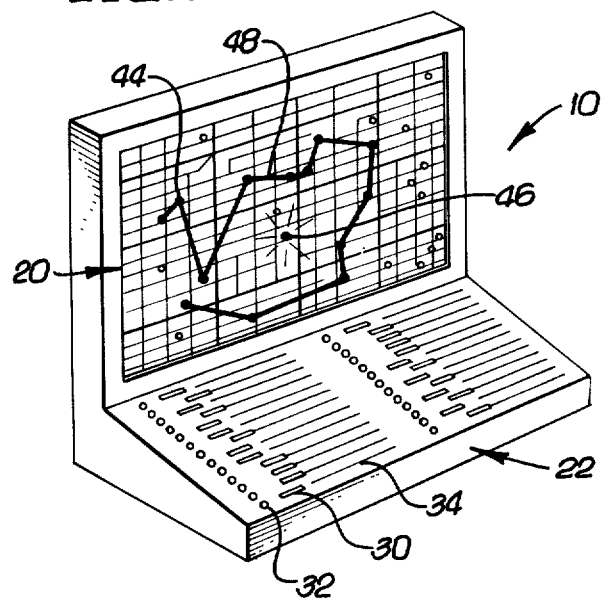
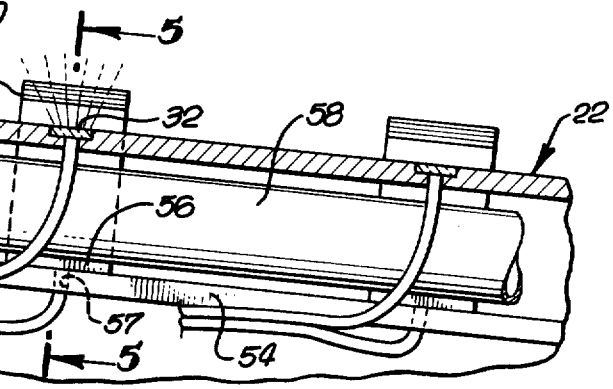
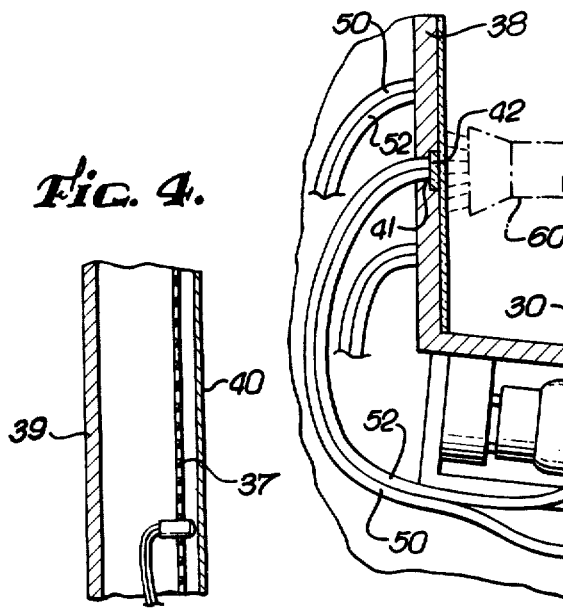
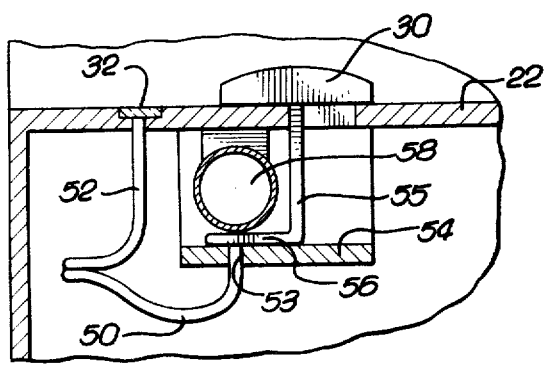
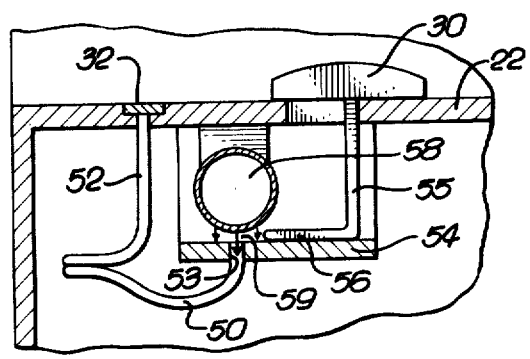

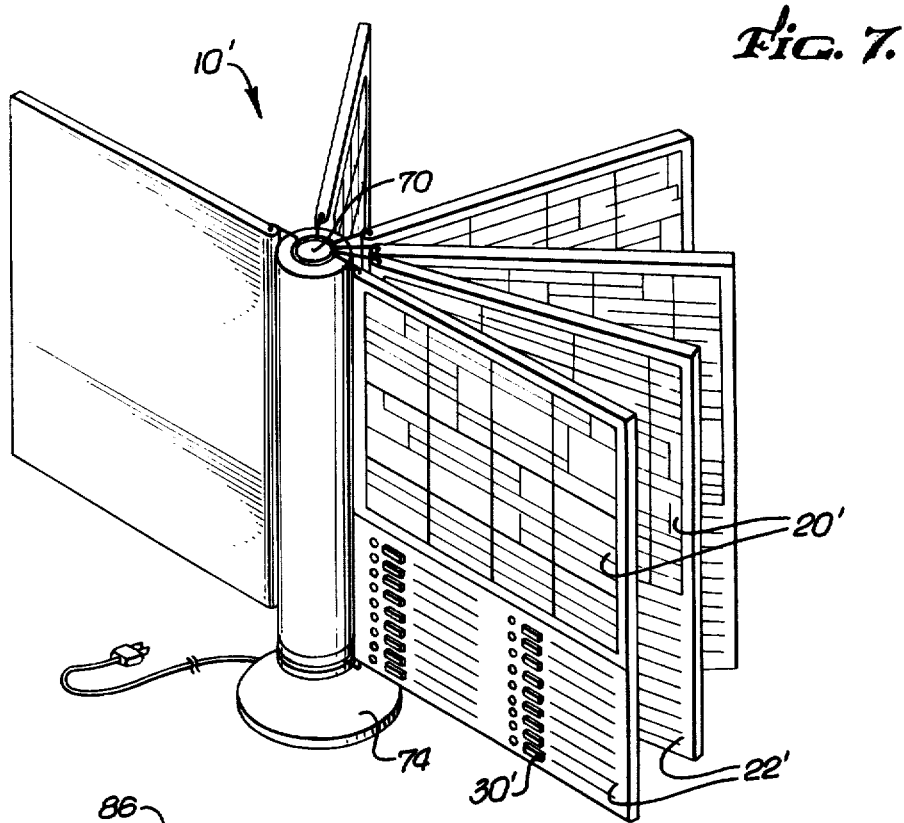
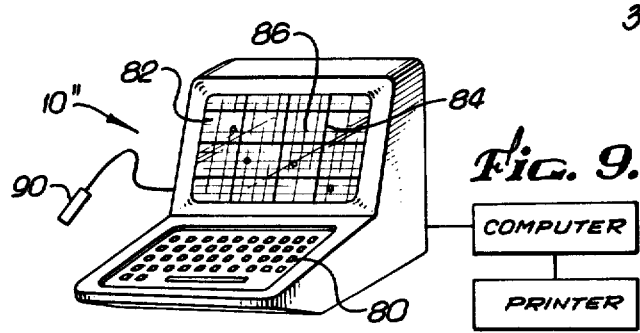
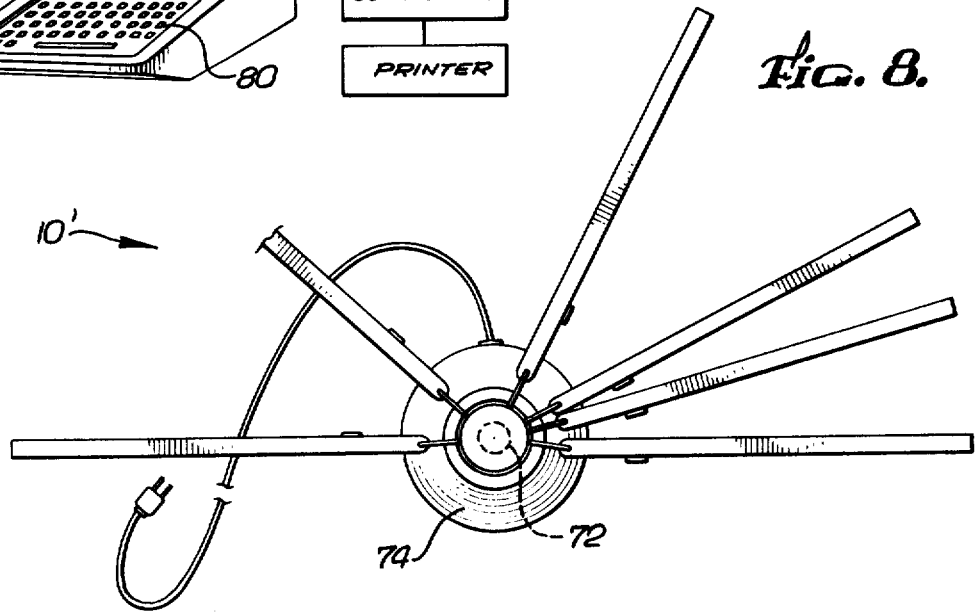

ROUTE MAPPING DEVICE

BACKGROUND OF THE INVENTION

1. Field of the Invention

This invention relates to route mapping devices and, more particularly, to a device for determining the optimum route for a delivery truck with many intermediate stops.

2. Prior Art

There are many businesses today which must make numerous deliveries each day to various customers throughout a large area. The customers to whom goods are being delivered may change every day, requiring the delivery route to be changed each day, too. Of course, with high fuel prices and other costs involved with making deliveries, there are substantial savings to be made in using the shortest and/or fastest route for servicing all of these customers.

A system currently in use for mapping such a delivery route involves a computerized print-out, known as a "truck and stop" list, containing the names and addresses of all customers of the company. This list, published periodically, divides large areas into smaller areas corresponding to deliveries made by each truck. Within each truck area, stop numbers are assigned, in numerical order, to customers that are within a particular delivery area. Thus, a list of customers to whom deliveries are to be made on a particular day in order of their delivery may be prepared by referring to the priority of the stop number of each customer.

If the list is arranged in the manner that represents an efficient delivery route, and *if* a representative sample of this list has an order going out on the truck, the driver should have a rough approximation of an efficient route to follow for his delivery. In practice, this system has several deficiencies though.

If an order comes in for a particular region that is not on the truck and stop list, it must be routed by hand. This kind of insertion into the list requires a thorough knowledge of the ara by the person doing the routing and is time consuming and inefficient. This is especially true during holidays or 4-day work weeks.

ALso, the present system has the potential for wasting considerable time and fuel. If there are large gaps in the deliveries for a particular day, the ordering of the route could well be less efficient than could be otherwise obtained.

Another deficiency is that, practically speaking, the computer list is only updated periodically. It frequently takes several weeks to get such an updated list. Thus, during most of the time each list is in use, all new customers must be routed by hand, a very slow and inefficient process.

Another system currently in use is for a truck and stop list to be prepared for each truck which includes a list of all customers who are expected to call in for deliveries the next day, plus all stops which salesmen are expected to make for their customers expecting delivery the next day. The potential stops are divided among the trucks and logical routes are prepared.

If customers other than those on the list call in, or if one of the salesman calls on a customer on a day other then his normal day, this new customer must be "feathered in" at the appropriate spot for the correct truck. It is the router's job to put these new customers on the right truck in the most efficient spot possible. If the computerized list was arranged correctly to begin with and if the feathering in is done correctly, the driver will have a logical route to follow for his deliveries.

Specifically, what is wrong with this system is that it tries to foretell the future. That is, it tries to predict which customers will call in for a delivery the next day and tries to preprepare an efficient route based on this divination. Not only is this impossible, it's even impossible to predict where the salesmen will go in that day.

If one salesman changes his day of call for a customer, he is automatically changing the prepared route list to an inefficient one. (Assuming it was correctly arranged to begin with). Salesmen make "wrong day" calls every day. Often customers call in for a second or third delivery for the week. There are shortages and reroutes every day. Nevertheless, the routes must be produced quickly so the orders can be sent to the warehouse to be filled with as little delay as possible. The result is that twenty or more miles are wasted out of every one hundred driven as well as resulting in much wasted driver overtime.

Yet another problem with the prior art methods is that the person preparing the route must have a high degree of skill and knowledge of the area. There is frequently no one to back up the regular router with the necessary skill. Thus, if the regular router quits or is sick, the company would have serious difficulties.

The ultimate reason for truck and stop numbers is speed. For example, a large distributor may serve literally thousands of customers. Some distributors serve their customers on a 24 hour basis and some on a 48 hour basis. Some distributors must route, process and fill hundreds of orders and get them delivered all on a 24 hour basis. Desiring speed the company tries to preassign days of delivery to each customer and assign to that customer a specific stop number on a specific truck. If the truck and stop number is pre-assigned the order can be "automatically" routed. Every time a given order comes in on a certain day it is assigned a certain truck and stop number. In the interest of speed the company is trying to do as much of the work of routing in advance as possible. Due to the limitations inherent in the truck and stop system indicated above, the company is forced to sacrifice accuracy in routing for speed in the processing of orders. Due to the limitations of the whole "truck and stop" system routes are produced that involve a great deal of "going out of the way" and "doubling back" costing the distributor a great deal in the way of wasted gas, driver overtime, unnecessary wear and tear on equipment, etc.

There are no device currently available which remedy these problems. There have been devices which have used fiber optics to a limited extent to determine routes by lighting up points on maps corresponding to various sites, for example, points of interest on a map of the city for the use of a visitor. However, such devices are not well suited to the task of preparing a route for a large number of individually selected customers. Devices of this sort do not permit a number of individually selected points to be lit simultaneously, nor are they useful where there is a large concentration of points on a map as each point could not be individually labelled with the necessary customer information. They would be very time consuming in actual use. They are also very difficult to update with new customer information and relatively expensive.

Another device which uses fiber optics to light up points on a map employs light conducting fibers to illuminate individual constellations on a star map. This device is not designed for mapping routes and would not be easily adaptable to such purpose since there is no means for keeping one set of lights lit while mapping a route. Further, it is not used as a route mapping device.

BRIEF SUMMARY OF THE INVENTION

It is therefore an object of this invention to provide a routing device which will expedite the fast and efficient mapping of the most efficient route for a truck to take in making a number of deliveries.

It is a further object of this invention to provide a device of the type described which will allow a person who has no special skills or knowledge of the area being mapped to map such a route.

It is yet another object of this invention to provide a device of the type described which may be easily updated with new customer information.

In general, the present invention comprises a transparent map of an area in which deliveries are to be made and a switch panel with a number of switches corresponding to each of the customers to whom the deliveries could possibly be made. On the switch panel, there are provided a plurality of names of customers. There is a switch next to each name which, when activated, will cause a light to flow through a light conduit in the Crofon tubing, to a point just behind the map. The light will then shine through the map at the appropriate location showing the location of the customer. Each name and switch on the switch panel leads to a separate light conduit which will light a corresponding point on the map thus forming a first set of light conduits. The ends of the light conduits are supported in a rigid support means behind the map.

There are also provided a second set of light conduits which run from a point in the map adjacent one of the first set of light conduits to a point on the switch panel next to the switch which corresponds to the light from the first set of conduits. Thus, if a light from a source such as a penlight flashlight is shown into one of the points of light on the map, it will cause a light to show next to the switch, and thus the name, which corresponds to that point on the map. This may also be done by holding a mirror in front of the appropriate point on the map and thus redirecting the outgoing light from the first light conduit back through the second light conduit.

In use, one activates each switch which corresponds to a customer to whom a delivery is to be made. This will light a series of lights at various locations on the map. Using a marker such as a grease pencil, a route can then be traced on the map from one light to the next in the most efficient manner depending upon traffic flow and other factors to be taken into consideration. Once the route is traced, a light can be shown into each customer location in the appropriate order along the route. This will show which light corresponds to which customer and a list of customers may be prepared in the proper delivery sequence by noting the order in which the lights next to each customer name is lit.

In another embodiment, there is provided a translucent map placed over a conventional cathode ray tube (CRT) with a computer device for directing the display of said CRT and input means of said computer such as a keyboard terminal. The operation of this embodiment is similar to that described above. A customer name (or number designation, etc.) is entered into the computer which is programmed to display said number (or a dot of light) on the CRT at a point corresponding to the customer location on the map in front of the CRT. This is repeated for each customer for whom a delivery is to be made. The router then draws an appropriate route on the map, connecting the customer numbers or dots. When numbers are displayed, the router can then easily type the customer numbers into the computer in their order along the route. The computer will then print out through a printer the ordered delivery list for the day. When just a dot is displayed (or with the number) the CRT may be provided with a means known in the art for detecting light input at discrete points on its face so that the router need merely shine a light into the CRT screen at each customer point in order along the route. This will be detected and the location information stored in the computer which can then print out an ordered customer list.

There are a number of advantages inherent in the design of the present invention. First, it is simple and efficient to use in mapping a delivery route. Second, it is easy to add late orders to the route. One need merely light the appropriate customer location, thereby making the proper detour apparent on the map. Third, it is easy to add new customers. With the first embodiment, one need merely assign the customer to a switch which is not yet in use and run the associated light conduit from the switch to the appropriate location in the support behind the map. A simple program may be used to add customers to the second embodiment.

The novel features which are believed to be characteristic of the invention, both as to its configuration and method of operation, together with further objectives and advantages thereof, will be better understood from the following description considered in connection with the accompanying drawing illustrating presently preferred embodiment of the invention by way of example. It is to be expressly understood, however, that the drawings are for the purposes of illustration and description only, and are not intended as a definition of the limits of the invention.

BRIEF DESCRIPTION OF THE DRAWINGS

FIG. 1 is a perspective view of the route mapping device of the present invention.

FIG. 2 is a perspective view of the route mapping device of the present invention showing a route mapped thereon.

FIG. 3 is a cross-sectional view of the route mapping device of the present invention taken along lines 3—3 of FIG. 1.

FIG. 4 is a cross-sectional view taken along lines 4—4 of FIG. 1 showing an alternate embodiment of the rigid support means of the present invention.

FIG. 5 is a cross-sectional view taken along lines 5—5 of FIG. 3 showing a switch in the "off" position.

FIG. 6 is a cross-sectional view taken along lines 5—5 of FIG. 3 showing a switch in the "on" position.

FIG. 7 is a perspective view of an alternate embodiment of the route mapping device of the present invention.

FIG. 8 is a top plan view of the alternate embodiment of FIG. 7.

FIG. 9 is a perspective view of another embodiment of the route mapping device of the present invention.

DETAILED DESCRIPTION OF THE PREFERRED EMBODIMENT

Referring first to FIGS. 1, 2, and 3, there is shown one embodiment of the route mapping device 10 of the present invention. The route mapping device 10 generally comprises a map panel 20 and switch panel 22. In the preferred embodiment, the map panel 20 is attached at one end to an end of the switch panel 22. The switch panel 22 forms the base of the device 10 and the map panel 20 extends upward therefrom. It is not necessary for the map panel 20 and the switch panel 22 to be physically connected. The configuration described is for convenience only.

The switch panel 22 contains a plurality of switches 30. The switches 30 may be of any conventional type such as sliding switches or toggle switches. In the embodiment shown, the switches 30 are slideable as will be discussed below. Adjacent each switch 30 and corresponding thereto is a nameplate 34 with the name of a customer to whom deliveries may be made plus possibly other relevant information. Also adjacent each said switch 30 is an indicator light 32. In the embodiment shown, the indicator light 32 is on the side of the switch 30 opposite the nameplate 34. It is also possible to position the indicator light 32 adjacent the nameplate 34 on either end thereof, just so that it will be associated with that nameplate 34 and switch 30.

The map panel 20 comprises a frame 36, a rigid support means 38 contained within the boundaries of said frame 36, and a transparent or translucent map 40 disposed over the front surface of the rigid support means 38. The rigid support means 38 may be a board through which holes may be drilled. Preferrably, the map 40 is composed of, or covered with, a material such as plastic which can be written upon with a marker such as a grease pencil and then the marks may be erased so that the map 40 may be reused.

Disposed at various points in the rigid support means 38 are a plurality of holes 41 in which are disposed map lights 42. These lights 42 may be translucent pieces of glass or plastic disposed such that their position behind the map 40 corresponds to the geographic position of a customer or they may simply be the ends of light conduits such as Crofon tubing as discussed below.

In another embodiment, as shown in FIG. 4, the rigid support means 38 may be a wire mesh screen 37 with openings of the same size as the diameter of the lights 42 such that the holes in the screen 37 function in the same way as holes 41. There may also be diagnosed a backboard 39 of a solid color behind the screen 37 to provide a solid background for the map 40.

There are the sets of light conduits 50 and 52 disposed in pairs in each hole 41 with their ends abuting the map light 42. Referring to FIGS. 3, 5 and 6, one can see the configuration and use of the light conduits 50 and 52.

Each of the first set of light conduits 50 extends from the map light 42 to the switch panel 22. Each of the second set of light conduits 52 also extends from the map light 42 to the switch panel 22 and terminates at a point directly beneath an indicator light 32 which corresponds to the appropriate customer nameplate 34. The indicator light is similar in construction to the map lights 42. The end of the second light conduit 50 at the switch panel 22 is inserted into a hole 53 in a bottom panel 54 which extends beneath a light source 58 such as a fluorescent bulb, connected to an appropriate source of electrical power. Disposed immediately adjacent the end of said first light conduit 50 and between said first light conduit 50 and said light source 58 is an opaque barrier 56. Because of barrier 56 light from the light source 58 is prevented from entering the light conduit 50 when the switch 30 is in the closed position. The barrier 56 is connected to the switch 30 by a leg 55 such that when the switch 30 is moved to the open position, the barrier 56 is caused to slide away from its position between the light source 58 and the light conduit 50 allowing light rays 59 to pass into the light conduit 50. The light is thereby conducted to a map light 42 where it shines through the map 40 as a point of light. The switch mechanism shown in the preferred embodiment is a mechanical sliding mechanism. Of course, any other conventional switching means such as electrical switches are contemplated as falling within the scope of the present invention. It is also possible to have a single bulb for each light conduit 50 so that one need merely turn the bulb on or off electrically to activate the map light 42. This separate bulb could also provide a point light source directly behind the map, thus eliminating the first set of light conduits 50.

In the operation of the route mapping device 10, one may start with a list of customers who have placed orders for deliveries for that day. The switches 30 corresponding to each of those customers are then activated. The switches 30 may be arranged in alphabetical order or numerical order to correspond to the way customers are referenced for ease of operation. When all of the switches corresponding to all of the customer deliveries for the day have been activated, a number of indicator lights 44 will be lit behind the map 40. It is then an easy matter to draw a route 48 which corresponds to the most efficient route to take to cover all of the customers.

It will also be an easy matter to add last minute customer orders to the route. One need merely activate the corresponding switch 30 which will then add the new indicator light 46 behind the map 40. A detour from the route 48 can then be drawn on the map 40.

A similar procedure can be used to alter the route 48 for customers with rush deliveries. Their locations may be noted on the map 40 so that appropriate detours can be easily plotted.

Once the route 48 is determined, one may shine a flashlight 60 into each lighted map light 44 in order along the route 48. This will cause light to be transmitted to the indicator light 32 which is next to the switch 30 which corresponds to the location on the map 40. Another way of lighting the indicator lights 32 is to hold a mirror in front of each lighted map light 44 which will redirect the light from the first light conduit 50 back into the second light conduit 52 which will then light up the indicator lights 32. As each indicator light 32 is lit along the route 48, one may mark the customer name or number next to each location on the map 40 or one may make an ordered list for use by the delivery truck. This allows each customer location to be identified without the necessity of marking on the map 40. When there is a high concentration of customers in a given area, it is extremely difficult and time consuming to write a name or number next to each location.

Another way of recording the route 48, after the notations are made on the map 40 for each customer, is to take a photograph of the map 40 with the route 48 drawn thereon. This photograph can then be used by the truck driver as a general indication of the most efficient route.

Also, a photograph may be taken of panel 22 after the nameplates 34 have been numbered in a proper delivery sequence for a given day's delivery. This delivery sequence will correspond to the route 48 drawn on map 40. The driver may then use this photograph as a route list, proceeding from the first customer name and address indicated in the photograph to the second customer address, to the third and so on. He will then be following efficient route 48, a route that minimizes "going out of the way" and "doubling back." The photograph may also serve as a permanent record of all orders routed.

In an alternate method of operation the customer account number on each sequenced nameplate 34 may be used to tell the computer in which order to print the invoices so they are numbered and hence loaded on the truck in a sequence that corresponds to efficient route 48.

Referring next to FIGS. 7 and 8, there is shown an alternate embodiment of the route mapping device 10' of the present invention. In the alternate embodiment, the device 10' comprises a plurality of map panels 20' and switch panels 22'. The map panels 20' and the switch panels 22' are generally coplanar and disposed one above the other in pairs of map panels 20' and switch panels 22'. The plurality of panels 20' and 22' are disposed about a common axis 70 in a carousel configuration and are pivotally attached thereto at one side. The axis 70 may be supported on a base 74.

There may be a plurality of light sources corresponding to each column of switches 30' on each panel 22'. In this case, the operation of each switch panel 22' and map panel 20' combination will be identical to that shown and described above.

Also, there may be a single light source 72 disposed at the axis 70 as shown in FIG. 8. A switch which electronically activates a means for unblocking the light to the light conduits may be used in this configuration. The light conduits which run from the map panel 20' to the switch panel 22' and the light source 72 are not shown in FIGS. 6 and 7, but their operation is essentially the same as described above in description of the preferred embodiment.

As an example, each of the first set of light conduits 50 may run from the map panel 20' to a point adjacent the axis 70 where an opaque barrier is interposed between the end of the light conduit 50 and the light source 72. When the corresponding switch on the switch panel 22' is activated, the barrier will be caused to slide from between the light conduit and the light source.

This alternate embodiment allows the routing of several groups of customers for several areas all with one compact device.

Referring to FIG. 9, there is shown yet another embodiment of the route mapping device 10'' of the present invention. In this embodiment the device 10'' comprises a conventional computer terminal with a keyboard 80 and a cathode ray tube (CRT) display 82. This terminal is in communication with a conventional computer (not shown) as well as a printer (not shown). A translucent map 84 similar to that shown in the first embodiment is placed over the CRT display 82.

The remaining features of this embodiment can best be seen by reference to the mode of operation as described hereinbelow. As orders are received for a particular area, the router inputs the customer into the computer by typing the appropriate number code or customer name, etc., on the keyboard 80. The computer is programmed to then cause the CRT display 82 to show a light 86 at a point corresponding to the customer location on the map 84. This light may be either a point of light or a customer designation such as a number code, etc.

When all of the customers for delivery have been thus input, the CRT display 82 will show a plurality of lights or figures 86 through the map 84 just as with the first embodiment described above. The router can then draw the desired route on the map between customers.

Two methods may be used to prepare a delivery list from this display. When customer codes or the like are displayed, the router can manually list the customers or may type the codes or names, in order, on the keyboard 80. The computer will store these customers in their proper order and can be programmed to print out a properly ordered list of names and addresses for delivery.

Another system which may be used employs means known in the art for detecting the location of the CRT output by means of a light pen 90. By using such a light pen 90, the router need merely place the light pen 90 at each customer location as indicated by a light 86 on the CRT 82 in the proper order. The computer can detect and store these locations and thus prepare an ordered delivery list from the stored information. The light pen 90 works by detecting the light output from the CRT 82 and coordinating the time of the light with the scanning position of the CRT 82. Such a device is well known in the art. By directly using the light output to feedback the customer at each location, this embodiment works much like placing a mirror up to each customer light 44 in the first embodiment.

In actuality, the computer can be further programmed to perform the tasks of the router in determining the proper route after the list of customers for a particular day has been entered. This would eliminate the need for an experienced, trained router in preparing such delivery lists.

While a wide variety of materials, shapes and other configurations can be used in this invention, it should be understood that the changes can be made without departing from the spirit or scope thereof. This invention, therefore, is not to be limited to the specific embodiments discussed and illustrated herein.

I claim:
1. A delivery route mapping device for ground vehicles comprising:
    a computer device;
    a cathode ray tube (CRT) having a display surface;
    a translucent map disposed on the display surface of the CRT, said CRT being in communication with the computer device which is programmed to direct the display of said CRT;
    means for entering into said computer device a list of customers to whom deliveries are to be made;
    means responsive to the entering means, for directing said computer to cause the CRT to display a plurality of lights behind said map, each said light corresponding to a location of a customer to whom deliveries are to be made; and
    means for associating each said light with the name of the customer to whom said light corresponds.
2. The device according to claim 1 wherein said entering means comprises a conventional keyboard.

3. The device according to claim 2 wherein said computer is programmed to display an individual code as the light corresponding to each said customer.

4. The device according to claim 3 wherein said computer is further programmed to compile a list of customer names and addresses corresponding to the order in which a plurality of codes is entered into said computer through said keyboard and said device further comprises printing means for displaying said list.

5. The device according to claim 4 wherein said CRT further comprises a light pen for detecting the location of each said light on the display surface of said CRT for storage by the computer.

6. The device according to claim 5 wherein said computer is further programmed to compile a list of customer names and addresses corresponding to the order in which the light pen detects displayed light locations for the CRT at each said light corresponding to a location of a customer and output said list to said printing means.

7. A route mapping device for determining a delivery schedule for a ground vehicle comprising:
 a map;
 means for entering a list of customers to whom deliveries are to be made;
 display means for simultaneously displaying a plurality of individual indicia on the map, each indicia corresponding to the location of a customer on the list to whom a delivery is to be made; and
 means for associating each displayed indicia with the name of the customer on the list;
 wherein the indicia may be linked to form one or more routes and the customers associated with the indicia on each route may be compiled on the order in which they appear on the routes to provide a delivery schedule.

8. The device of claim 7 wherein the display means and the entering means include a computer.

9. The device according to claim 8 wherein said computer is programmed to display an individual code as the indicia corresponding to each customer.

10. The device according to claim 8 wherein the display means comprises a cathode ray tube having a display surface for displaying the indicia and the associating means further comprises a light pen coupled to the computer and the cathode ray tube for detecting the location of each of the displayed indicia on the display surface of the CRT for storage by the computer.

11. The device according to claim 10 wherein the computer is further programmed to compile a list of customer names and addresses corresponding to the order in which the light pen detects the displayed indicia on the cathode ray tube display surface.

12. A delivery route mapping device for ground vehicles comprising:
 means for entering a list of customers;
 a map including a plurality of display means for providing an individual display of the location of each customer;
 means for selectively activating selected display means wherein the display means provide a display of only those customers to which a delivery is to be made, wherein a delivery route is determined by viewing the map; and
 detection means, operatively coupled to both the display means and entering means, for sequentially detecting locations from the map which correspond to the determined route and for providing a customer indication corresponding to the detected locations.

* * * * *